United States Patent
Chang

(10) Patent No.: US 8,014,612 B2
(45) Date of Patent: Sep. 6, 2011

(54) IMAGE PROCESSING DEVICE AND METHOD FOR COMPRESSING AND DECOMPRESSING IMAGES

(75) Inventor: Fang-Chen Chang, Tainan County (TW)

(73) Assignee: Himax Technologies Limited, Sinshih Township, Tainan County (TW)

( * ) Notice: Subject to any disclaimer, the term of this patent is extended or adjusted under 35 U.S.C. 154(b) by 998 days.

(21) Appl. No.: 11/871,197

(22) Filed: Oct. 12, 2007

(65) Prior Publication Data
US 2009/0097759 A1 Apr. 16, 2009

(51) Int. Cl.
*G06K 9/36* (2006.01)
*G06K 9/46* (2006.01)
(52) U.S. Cl. ........................................ 382/232
(58) Field of Classification Search .................. 382/232, 382/233, 238, 246; 341/50, 59, 81, 106; 375/240.23, 286, E7.088, E7.265; 348/384.1, 348/390.1; 358/426.01, 426.06, 426.08, 358/426.14
See application file for complete search history.

(56) References Cited

U.S. PATENT DOCUMENTS

| | | | | |
|---|---|---|---|---|
| 5,812,076 | A * | 9/1998 | Yoshida | 341/106 |
| 5,884,010 | A * | 3/1999 | Chen et al. | 704/228 |
| 6,111,834 | A * | 8/2000 | Rub et al. | 360/48 |
| 6,744,925 | B2 * | 6/2004 | Kimura et al. | 382/238 |
| 6,839,004 | B2 * | 1/2005 | Tsang | 341/59 |
| 7,627,181 | B2 * | 12/2009 | Tamura et al. | 382/232 |
| 7,860,323 | B2 * | 12/2010 | Kim et al. | 382/232 |
| 2008/0074297 | A1 * | 3/2008 | Eroz et al. | 341/81 |
| 2009/0097759 | A1 * | 4/2009 | Chang | 382/232 |

* cited by examiner

*Primary Examiner* — Amir Alavi
(74) *Attorney, Agent, or Firm* — Thomas|Kayden

(57) ABSTRACT

The disclosed image processing device receiving image data comprises a first encoder, a second encoder and an encoding switch. The first encoder generates first data by encoding the image data according to a predetermined method. The second encoder generates second data by encoding the image data according to an encoding pattern table. The encoding pattern table is set up in accordance with the first data. The encoding switch determines to output either the first data or the second data as an encoded result and generates a mark value for indicating the encoded result.

20 Claims, 7 Drawing Sheets

|     |     |     |     |
| --- | --- | --- | --- |
| 58  | 58  | 58  | 200 |
| 58  | 58  | 58  | 200 |
| 202 | 67  | 65  | 200 |
| 200 | 65  | 67  | 200 |

IMG

FIG. 4B

| 0 | 58 |
| --- | --- |
| 1 | 160 |
| 2 | 200 |
| 3 | 79 |
| 4 | 105 |
| 5 |    |
| 6 |    |
| 7 |    |

| 0 | 7 | 9 | 0 |
|---|---|---|---|
| 2 | 9 | 7 | 0 |
| 0 | 0 | 0 | 0 |
| 0 | 0 | 0 | 0 |

FIG. 4D

| 010 | 000 | 000 | 010 |
|---|---|---|---|
| 010 | 000 | 000 | 010 |
| 010 | 000 | 000 | 010 |
| 010 | 000 | 000 | 010 |

DAT$_2$

FIG. 4C

|   |     |
|---|-----|
| 0 | 58  |
| 1 | 160 |
| 2 | 200 |
| 3 | 79  |
| 4 | 105 |
| 5 |     |
| 6 |     |
| 7 |     |

DAT$_2$

| 010 | 000 | 000 | 010 |
|-----|-----|-----|-----|
| 010 | 000 | 000 | 010 |
| 000 | 000 | 000 | 010 |
| 000 | 000 | 000 | 010 |

| 200 | 58 | 58 | 200 |
|-----|----|----|-----|
| 200 | 58 | 58 | 200 |
| 58  | 58 | 58 | 200 |
| 58  | 58 | 58 | 200 |

FIG. 5C

IMAGE PROCESSING DEVICE AND METHOD FOR COMPRESSING AND DECOMPRESSING IMAGES

BACKGROUND OF THE INVENTION

1. Field of the Invention

The present invention relates to image processing, and in particular relates to devices and methods of image compression and decompression for synthetic images

2. Description of the Related Art

The rapid growth of digital imaging applications, including desktop publishing, multimedia, teleconferencing, and high-definition television (HDTV) has increased the need for efficient and standardized image compression techniques. Without image compression, the transmission of images would require an unacceptable bandwidth for many applications. As a result, methods of compressing images have been the subject of numerous research publications. Image compression schemes convert an image consisting of a two-dimensional array of pixels into a sequence of bits which are transmitted over a communication link. Each pixel represents the intensity of the image at a particular location therein. The transmission link may be an ordinary telephone line.

Consider an image comprising a gray-scale representation of a photograph at a resolution of 1000×1000 lines. Each pixel typically consists of 8 bits which are used to encode 256 possible intensity levels at the corresponding point on the photograph. Hence, without compression, transmission of the photograph requires that 8 million bits be sent over the communication link. A typical telephone line is capable of transmitting about 9600 bits per second; hence the picture transmission would require more than 10 minutes. Transmission times of this magnitude are unacceptable.

As a result, image compression systems are needed to reduce transmission time. It is also apparent to those skilled in the art that image compression systems may also be advantageously employed in image storage systems to reduce the amount of memory needed to store one or more images.

Further, there are two kinds of images, natural images and synthetic images. In general, high frequency components only occur in luminance domain for natural images. Contrary to natural images, high frequency components occur in both of luminance and chrominance domains for synthetic images. Due to synthetic images having more high frequency components than natural images, it is more difficult to compress synthetic images than natural images.

BRIEF SUMMARY OF INVENTION

A detailed description is given in the following embodiments with reference to the accompanying drawings.

An image processing device is disclosed. The image processing device receiving image data comprising a plurality of pixel values comprises a first encoder, a second encoder and an encoding switch. The first encoder is configured to generate first data by encoding the image data according to a predetermined method. The second encoder is configured to generate second data by encoding the image data according to an encoding pattern table. The encoding pattern table is set up in accordance with the first data The encoding switch is configured to determine to output either the first data or the second data as an encoded result and generate a mark value for indicating the encoded result.

An image processing method is disclosed. The image processing method receives image data comprising a plurality of pixel values by an image processing unit. An encoding pattern table comprising a plurality of encoding indexes and encoding values stored in a first storage element is provided. Each encoding value corresponding to one of the encoding indexes in the encoding pattern table. First data is generated by encoding the image data according to a predetermined method. Second data is generated by encoding the image data according to the encoding pattern table. Either the first data or the second data is determined to be outputted as an encoded result according to characteristics of the first data and the second data by an encoding switch. First decoding data comprising first values is obtained by decoding the first data according to the predetermined method and using the first values to update the encoding values in the encoding pattern table when the encoded result is the first data encoded according to the predetermined method. A mark value indicating the encoded result is the first data encoded according to the predetermined method or is the second data encoded according to the encoding pattern table is generated.

BRIEF DESCRIPTION OF DRAWINGS

The present invention can be more fully understood by reading the subsequent detailed description and examples with references made to the accompanying drawings, wherein:

FIG. 4A is a diagram illustrating an exemplar of the encoding pattern table in an embodiment;

FIG. 4B is a diagram illustrating an exemplar of the image data in an embodiment;

FIG. 4C is a diagram illustrating an exemplar of the second data encoded according to the encoding pattern table in FIG. 4A from the image data in FIG. 4B;

FIG. 4D is a diagram illustrating an exemplar of the coding error of the second data in FIG. 4C.

FIG. 5A is a diagram illustrating an exemplar of the decoding pattern table in an embodiment;

FIG. 5B is a diagram illustrating an exemplar of the second data in an embodiment;

FIG. 5C is a diagram illustrating an exemplar of the second decoding data decoded according to decoding pattern table in FIG. 5A from the second data in FIG. 5B.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
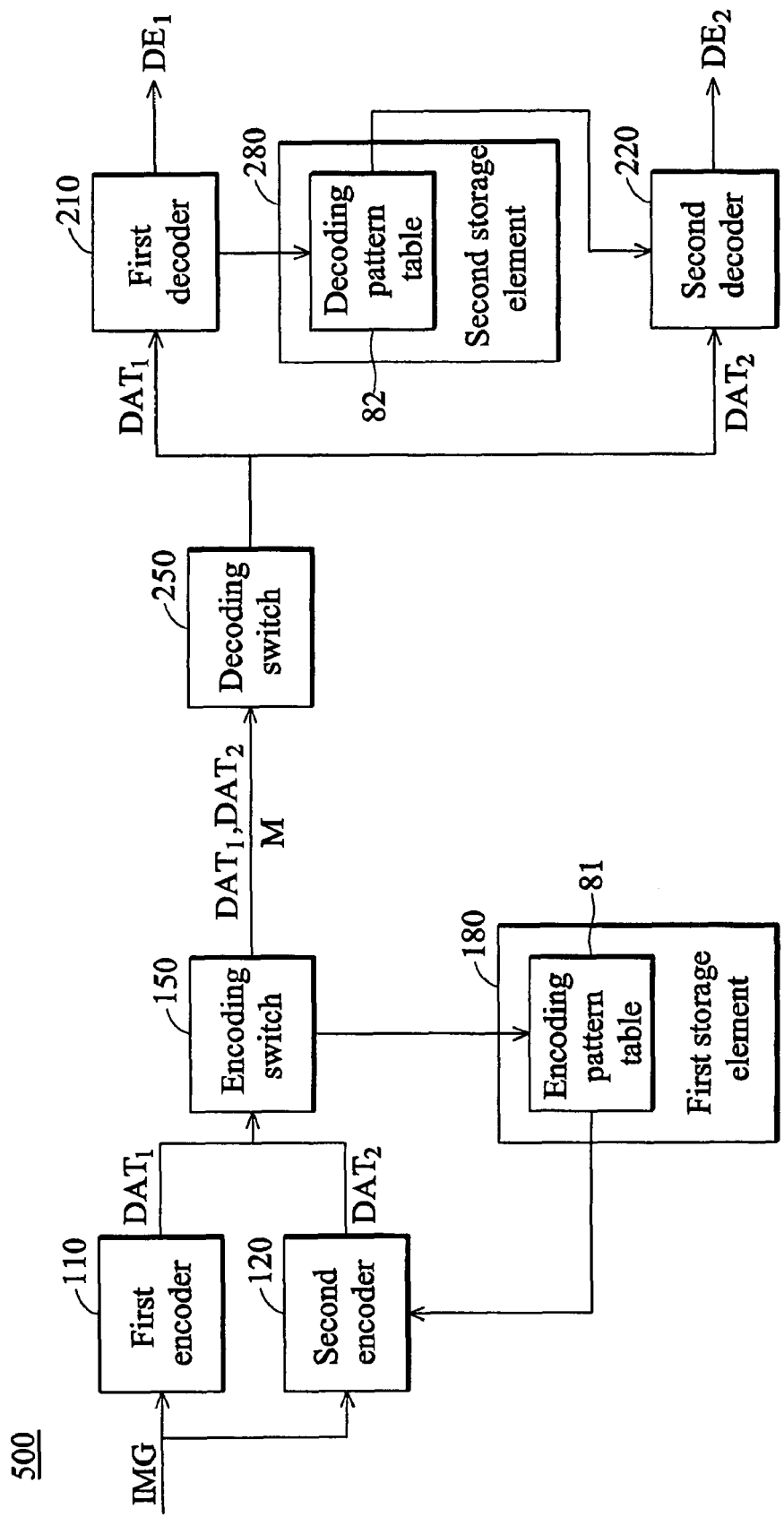
FIG. 1 is a diagram illustrating the image processing device disclosed in the embodiment.
Figure 2B:
FIG. 2B is a diagram illustrating an exemplar of the decoding pattern table in the embodiment.
Figure 2A:
FIG. 2A is a diagram illustrating an exemplar of the encoding pattern table in the embodiment.

To efficiently compress synthetic images, an image processing device and a method for compressing and decompressing images with increasing compression rate for synthetic images is disclosed. FIG. 1 is a diagram illustrating the image processing device disclosed in the embodiment. Image processing device 500 comprises a first encoder 110, a second encoder 120, an encoding switch 150, a first storage element 180, a first decoder 210, a second decoder 220, a decoding switch 250 and a second storage element 280. An encoding pattern table 81 comprising a plurality of encoding indexes and encoding values is stored in first storage element 180. In the encoding pattern table, each encoding value corresponds to one of the encoding indexes. A decoding pattern table 82 comprising a plurality of decoding indexes and decoding values is stored in second storage element 280. In the decoding pattern table, each decoding value corresponds to one of the decoding indexes. The details of generating both encoding pattern table 81 and decoding pattern table 82 are introduced later. Sizes of encoding pattern table 81 and decoding pattern table 82 are the same and limited depending on requirements, for example, encoding pattern table 81 may record k+1 encoding values $EV_0$~$EV_k$ corresponding to encoding indexes 0~k as shown in FIG. 2A, along with decoding pattern table 82 as shown in FIG. 2B. There are k+1 decoding values $DV_0$~$DV_k$ corresponding to decoding indexes 0~k which may be recorded in decoding pattern table 82.

In the beginning, all the encoding values and the decoding values are null. First, image processing device 500 initially receives image data $IMG_0$. First encoder 110 generates first data $DAT_1$ by encoding $IMG_0$ according to discrete cosine transformation (DCT) method, which is a predetermined method in the embodiment. Next, encoding switch 150 outputs first data $DAT_1$ as an encoding result and obtains first decoding data $DE_1$ comprising first values $v1_0$~$v1_n$ by decoding $DAT_1$ according to the DCT method. Then, encoding pattern table 81 with null encoding values is updated by first data $DAT_1$, first values $v1_0$~$v1_n$ are added to be the encoding values in encoding pattern table 81. Please note that, when any two of the first values are close, only one of them is added into encoding pattern table 81.

Figure 3B:
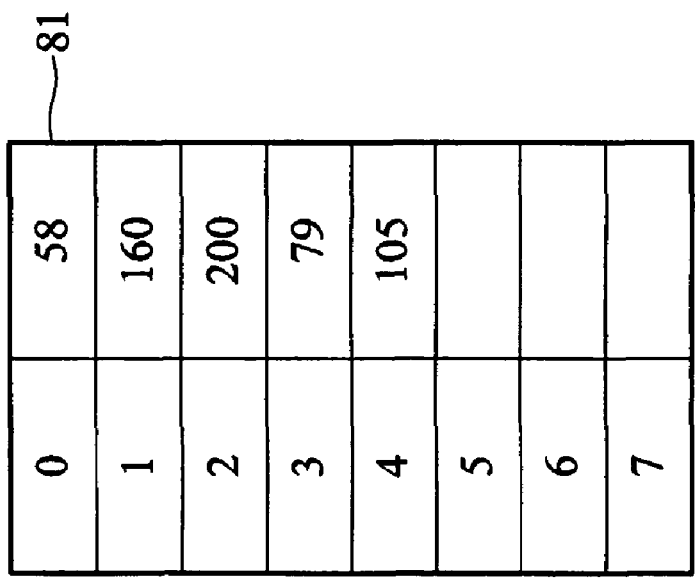
FIG. 3B is a diagram illustrating an exemplar of the encoding pattern table updated by the first values in FIG. 3A.
Figure 3A:
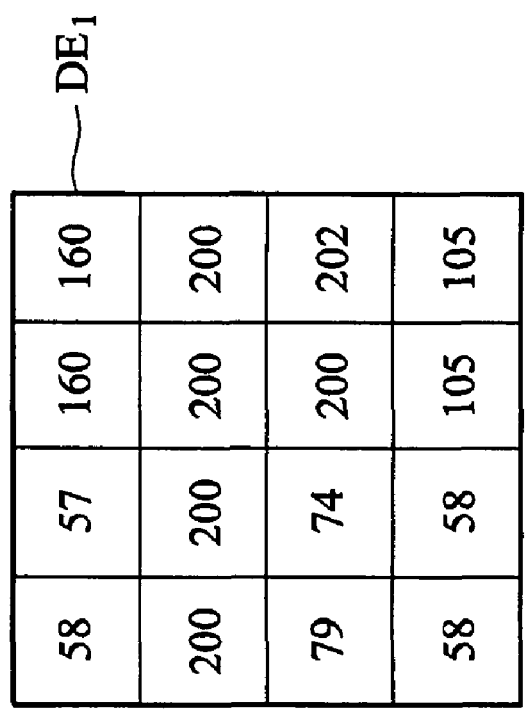
FIG. 3A is a diagram illustrating an exemplar of the first decoding data comprising the first values in an embodiment.

An exemplary embodiment of using the first values to update encoding pattern table 81 is shown as follows. In the embodiment, encoding pattern table 81 may recode 8 encoding values $EV_0$~$EV_7$, $EV_0$~$EV_7$ are null in the beginning. First decoding data $DE_1$ comprising 16 first values $V1_0$~$v1_5$ is decoded from $DAT_1$ according to the DCT method as shown in FIG. 3A. For $v1_0$, since all the encoding values are null, first encoder 110 adds 58($v1_0$) to encoding pattern table 81 to update $EV_0$. Next for $v1_1$, difference between 57($v1_1$) and 58($EV_0$) is 1: which is not larger than 8, thus 57($v1_1$) is not added to encoding pattern table 81. For $v1_2$, differences between 160 ($v1_2$) and 58($EV_0$) is 102 which is larger than 8, thus 160($v1_2$) is added to encoding pattern table 81 to update $EV_1$. For $V1_3$, difference between 160($v1_1$) and 160($EV_1$) is 0 which is not larger than 8, thus 16($v1_3$) is not added to encoding pattern table 81 either. For $V_{14}$, difference between 200($v1_4$) and 58($EV_0$) is 142 and difference between 200($v1_4$) and 160 ($EV_1$) is 40, which are both larger than 8, thus 200($v1_4$) is added to encoding pattern table 81 to update $EV_2$. After $v1_0$~$v1_{15}$ are completely considered, encoding values $EV_0$~$EV_4$ in encoding pattern table 81 are updated as 58, 160, 200 79 and 105, encoding values $EV_5$~$EV_7$ are kept being null. FIG. 3B is the updated encoding pattern table 81.

After encoding pattern table 81 is initially updated, image processing device 500 receives next image data IMG comprising a plurality of pixel values $p_0$~$p_n$. First encoder 110 generates first data $DAT_1$ by encoding IMG according to discrete cosine transformation (DCT) method, which is a predetermined method in the embodiment. Simultaneously, second encoder 120 generates second data $DAT_2$ by encoding IMG according to encoding pattern table 81. To generate the second data $DAT_2$, second encoder 120 compares each pixel value with encoding values $EV_0$~$EV_k$ in encoding pattern table 81 to obtain the encoding values which have the least difference with the pixel values in the encoding pattern table to generate second data $DAT_2$. Second data $DAT_2$ comprises a plurality of bins $b_0$~$b_n$, the bins are equivalent to the corresponding encoding indexes, and each encoding indexes corresponds to a pixel value in image data IMG.

An exemplary embodiment of second encoder 120 encoding image data IMG according to encoding pattern table 81 is shown as follows. Encoding pattern table 81 may recode 8 encoding values $EV_0$~$EV_7$. After initially updating encoding pattern table 81, the values of $EV_5$~$EV_7$ are null, for example, and $EV_0$~$EV_4$ corresponding to encoding indexes 0~4 are 58, 160, 200, 79 and 105 respectively as shown in FIG. 4A. Image data IMG comprising 16 pixel values $p_0$~$p_{15}$ is received by second encoder 120 as shown in FIG. 4B. Second encoder 120 compares pixel value 200($p_0$) with the encoding values in encoding pattern table 81. Encoding value 200($EV_2$) corresponding to encoding index 2 has the least difference with pixel value 200($p_0$) in encoding pattern table 81. Thus second encoder 120 generates bin $b_0$ of second data $DAT_2$ to represent pixel value 200($p_0$), wherein bin $b_0$ is equivalent to encoding index 2 and symbolized by binary data 010. Similarly, second encoder 120 then compares pixel value 202($p_1$) with the encoding values in encoding pattern table 81. Encoding value 200($EV_2$) corresponding to encoding index 2 has the least difference with pixel value 202($p_1$) in encoding pattern table 81, thus bin $b_1$ of second data $DAT_2$ corresponding to $p_1$ is symbolized by 010, too. Next, encoding value 58 corresponding to encoding index 0 has the least difference with pixel value 58($p_3$), thus bin $b_3$ of second data $DAT_2$ corresponding to $p_3$ is equivalent to encoding index 0 and symbolized by binary data 000. After finishing comparing all of the pixel values $p_0$~$p_{15}$ with the encoding values in encoding pattern table 81, bins $b_0$~$b_n$ corresponding to pixel values $p_0$~$p_n$ are obtained and FIG. 4C is shown the second data $DAT_2$ comprising bins $b_0$~$b_n$.

After generating $DAT_1$ and $DAT_2$ by first encoder 110 and second encoder 120 respectively, encoding switch 150 determines to output either first data $DAT_1$ or second data $DAT_2$ as an encoded result according to characteristics of first data $DAT_1$ and second data $DAT_2$. The characteristics are data lengths and coding errors of first data $DAT_1$ and second data $DAT_2$ in the embodiment. Encoding switch 150 determines to output second data $DAT_2$ as the encoded result when sum of the data length and the coding error of second data $DAT_2$ is less than sum of the data length and the coding error of the first data $DAT_1$. Otherwise, encoding switch 150 determines to output first data $DAT_1$ as the encoded result.

Data lengths of $DAT_1$ and $DAT_2$ are calculated by numbers of bits in $DAT_1$ and $DAT_2$. For example, the data length of $DAT_2$ in FIG. 4C is 48. To calculate the coding error of $DAT_1$, encoding switch 150 first obtains first decoding data $DE_1$, as shown in FIG. 4A, comprising first values $v1_0$~$v1_n$ by decoding $DAT_1$ according to the DCT method. The coding error of $DAT_1$ is calculated according to the difference between pixel values $p_0$~$p_n$ of IMG and first values $v1_0$~$v1_n$ of decoding data $DE_1$. Similarly, the coding error of $DAT_2$ is calculated according to pixel values $p_0$~$p_n$ of IMG and bins $b_0$~$b_n$ which corresponding to encoding values of pixel values. In the embodiment, the coding error of $DAT_1$ is calculated by summing up absolute differences between the pixel values and the first decoding data $DE_1$, wherein coding error of $$DAT_1 = \sum_{i=0}^{n} |p_i - v_i|.$$

The coding error of $DAT_2$ is calculated by summing up absolute differences between pixel values $p_0 \sim p_n$ and the encoding values of pixel values, wherein coding error of $$DAT_2 = \sum_{i=0}^{n} |p_i - EV_{b_i}|.$$

For example, referencing FIGS. 4B and 4C, encoding value 200($EV_2$) corresponding to encoding index 2 is symbolized by bin $b_0$, thus the absolute difference between pixel value 200($p_0$) and bin $b_0$ is 0. FIG. 4D is the absolute differences between pixel values $p_0 \sim p_{15}$ and bins $b_0 \sim b_n$. The sum of the absolute differences of $DAT_2$ is 34. In the embodiment, the coding error of $DAT_2$ is 34 accordingly. Thus, the sum of the data length and the coding error of $DAT_2$ are 82. Encoding switch 150 outputs $DAT_2$ as the encoded result when 82, the sum of the data length and the coding error of $DAT_2$, is less than the sum of the data length and the coding error of $DAT_1$.

When encoding switch 150 determines to output first data $DAT_1$ as the encoded result, encoding switch 150 uses first values $v1_0 \sim v1_n$ in $DE_1$ to update the encoding values $EV_0 \sim EV_k$ in encoding pattern table 81. Encoding values $EV_0 \sim EV_k$ are updated by adding the first values, whose differences from encoding values $EV_0 \sim EV_k$ in encoding pattern table 81 are larger than 8, which is a predetermined threshold, to the encoding pattern table. When the number of the encoding values reaches the predetermined value, i.e. there is no null in $EV_0 \sim EV_k$, the encoding value which is first added to encoding pattern table 81 is replaced with the adding first value. For example, the encoding pattern table 81 which is going to be updated is shown as FIG. 4B. When one of the first values is 205, 205 is not added into the encoding pattern table because encoding value 200 exists in the table, in which the difference between 205 and 200 is not larger than 8. On the other hand, when one of the first values is 50, 50 is added into the encoding pattern table because differences between 50 and each encoding values are larger than 8. After determining to output $DAT_1$ or $DAT_2$, encoding switch 150 generates a mark value M, indicating the encoded result is first data $DAT_1$ encoded according to the DCT method by first encoder 110 or is second data $DAT_2$ encoded according to encoding pattern table 81 by second encoder 120.

Decoding switch 250 receives the encoded result, either first data $DAT_1$ or second data $DAT_2$, and mark value M outputted from encoding switch 150. Decoding switch 250 determines the encoded result is first data $DAT_1$ encoded according to the DCT method by first encoder 110 or is second data $DAT_2$ encoded according to encoding pattern table 81 by second encoder 120 according to the mark value M.

When the encoded result is first data $DAT_1$ encoded according to the DCT method by first encoder 110, first decoder 210 generates first decoding data $DE_1$ comprising first values $v1_0 \sim v1_n$ by decoding the encoded data, $DAT_1$ according to the DCT method, the predetermined method, and uses $v1_0 \sim v1_n$ to update $DV_0 \sim DV_k$ in decoding pattern table 82. The updating method for decoding pattern table 82 is the same as encoding pattern table 81. Decoding values $DV_0 \sim DV_k$ are updated by adding first values $v_0 \sim v_n$, whose differences from decoding values $DV_0 \sim DV_k$ in decoding pattern table 82 are larger than 8, the predetermined threshold, to decoding pattern table 82. As encoding pattern table 81, when the number of decoding values reaches the predetermined value, i.e. there is no null in $DV_0 \sim DV_k$, the decoding value which is first added to decoding pattern table 82 is replaced with the adding first value.

Contrarily, when the encoded result is second data $DAT_2$ encoded according to encoding pattern table 81 by second encoder 120, second decoder 220 generates second decoding data $DE_2$ by decoding the encoded data, $DAT_2$, according to decoding pattern table 82. For generating second decoding data $DE_2$, second decoder 220 compares each bin in $DAT_2$ with the decoding indexes 0~k in decoding pattern table 82 to obtain the decoding values corresponding to the decoding indexes which are equivalent to bins $b_0 \sim b_n$ to generate $DE_2$. $DE_2$ comprises a plurality of second values $v2_0 \sim v2_n$, $v2_0 \sim v2_n$ are equivalent to the corresponding decoding values, and each second value corresponds to a bin in $DAT_2$.

An exemplary embodiment of second decoder 220 decoding second data $DAT_2$ according to decoding pattern table 82 is shown as follows. Decoding pattern table 82 shown in FIG. 5A may recode 8 encoding values $DV_0 \sim DV_7$. At the beginning, the values of $DV_5 \sim DV_7$ are null and $DV_0 \sim DV_4$ corresponding to decoding indexes 0~4 in decoding pattern table 81 are 58, 160, 200, 79 and 105 respectively. Referring to FIG. 5B, second data $DAT_2$ comprising 16 bins $b_0 \sim b_{15}$ is received by second decoder 220 from decoding switch 250. Second decoder 220 compares $b_0$ with decoding indexes in decoding pattern table 82. The decoding value corresponds to encoding index 2 which is equivalent to $b_0$ is 200($DV_2$), thus second value $v2_0$ corresponding to $b_0$ is 200. Similarly, second decoder 220 then compares $b_1$ with each encoding index in decoding pattern table 82. The encoding value corresponding to decoding index 2 which is equivalent to $b_1$ is 200($DV_2$), second value $v2_1$ corresponding to $b_1$ is 200, too. Next, the decoding value corresponding to decoding index 0 which is equivalent to $b_2$ is 58($DV_0$), thus second value $v2_2$ corresponding to $b_2$ is 58. After finishing comparing all of the bins $b_0 \sim b_{15}$ with the decoding values in decoding pattern table 82, the second values $v2_0 \sim v2_n$ corresponding to the pixel values $b_0 \sim b_n$ are the second decoding data $DE_2$ as shown in FIG. 5C.

Figure 6:
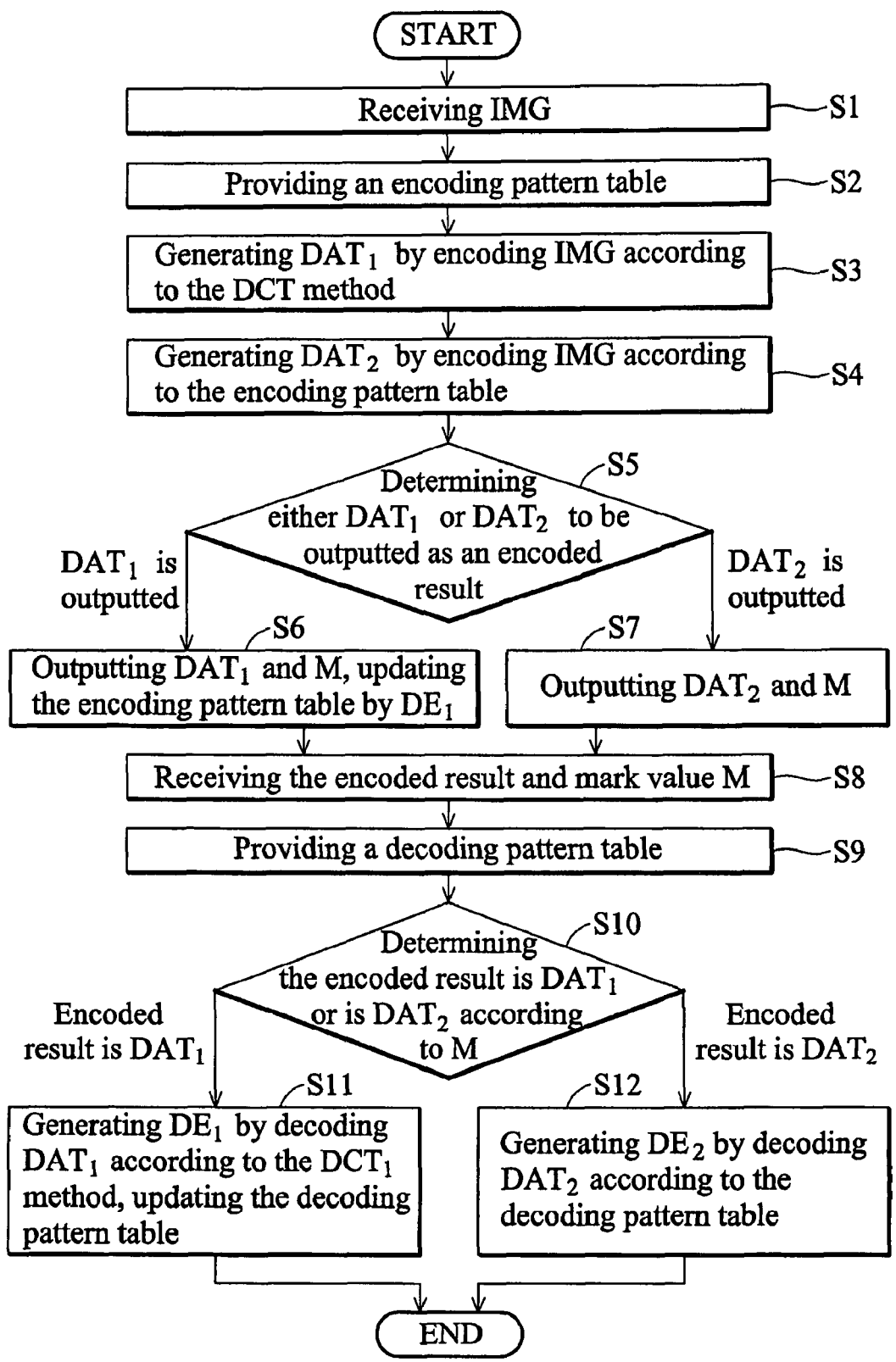
FIG. 6 is a flowchart of the image processing method disclosed in an embodiment.

FIG. 6 is a flowchart of the image processing method disclosed in an embodiment. Image data IMG comprising a plurality of pixel values $p_0 \sim p_n$ is received by an image processing device (S1) An encoding pattern table comprising a plurality of encoding indexes 0~k and encoding values $EV_0 \sim EV_k$ stored in a first storage element is provided. (S2) Each encoding value corresponds to one of the encoding indexes in the encoding pattern table. First data $DAT_1$ is generated by encoding image data IMG according to the DCT method, the predetermined method. (S3) Second data $DAT_2$ is generated by encoding image data IMG according to the encoding pattern table. (S4) Either first data $DAT_1$ or second data $DAT_2$ is determined to be outputted as an encoded result according to characteristics of $DAT_1$ and $DAT_2$ by an encoding switch. (S5) A mark value M indicating the encoded result is the first data $DAT_1$ encoded according to the DCT method or is the second data $DAT_2$ encoded according to the encoding pattern table is outputted by the encoder switch. When the encoded result is the first data encoded according to the DCT method, first decoding data $DE_1$ comprising first values $v1_0 \sim v1_n$ by decoding first data $DAT_1$ according to the DCT method and first values $v1_0 \sim v1_n$ is used to update encoding values $EV_0 \sim EV_k$ in the encoding pattern table, $DAT_1$ and mark value M indicating the encoded result is the first encoded data are outputted by the encoding switch. (S6) When the encoded result is the second data encoded according to the encoding pattern table, $DAT_2$ and mark value M indicating the encoded result is the second data are outputted by the encoder switch (S7).

In S4, second data $DAT_2$ comprises a plurality of bins $b_0 \sim b_n$. Each pixel value $p_0 \sim p_n$ is compared with encoding values $EV_0 \sim EV_k$ in the encoding pattern table to generate second data $DAT_2$. Bins in $DAT_2$ are equivalent to the encoding indexes corresponding to the encoding values which have the least difference with the pixel values in the encoding pattern table.

In S5, the characteristic are data lengths and coding errors of $DAT_1$ and $DAT_2$ in the embodiment. Second data $DAT_2$ is determined to be outputted when sum of the data length and the coding error of $DAT_2$ is less than sum of the data length and the coding error of $DAT_1$. To calculate the coding error of $DAT_1$, encoding switch 150 first obtains first decoding data $DE_1$ comprising first values $v1_0 \sim v1_n$ by decoding $DAT_1$ according to the DCT method. Each first value in $DE_1$ corresponds to a pixel value in IMG. The coding error of $DAT_1$ is calculated according to pixel values $p_0 \sim p_n$ and first values $v1_0 \sim v1_n$ in $DE_1$, the coding error of $DAT_2$ is calculated according to pixel values $p_0 \sim p_n$ and bins $b_0 \sim b_n$ in $DAT_2$. In the embodiment, the coding error of $DAT_1$ is calculated by summing up absolute differences between $p_0 \sim p_n$ and $v1_0 \sim v1_n$ in $DE_1$, and the coding error of $DAT_2$ is calculated by summing up absolute differences between $p_0 \sim p_n$ and the encoding values corresponding to the encoding indexes which are equivalent to $b_0 \sim b_n$ in $DAT_2$.

In S6, encoding values $EV_0 \sim EV_k$ are updated by adding the first values, whose differences from the encoding values in the encoding pattern table are larger than a predetermined threshold, to the encoding pattern table. Number of the encoding values in the encoding pattern table is under a predetermined value, the encoding value which is first added to the encoding pattern table are replaced with the adding first value when the number of the encoding values reaches the predetermined value.

The encoded result and mark value M outputted from the encoding switch are received by a decoding switch. (S8) A decoding pattern table comprising a plurality of decoding indexes 0~k and decoding values $DV_0 \sim DV_k$ stored in a second storage element is provided. (S9) Each decoding value corresponds to one of the decoding indexes in the decoding pattern table. The encoded result is the first data $DAT_1$ encoded according to the DCT method or is the second data $DAT_2$ encoded according to the encoding pattern table is determined according to mark value M. (S10) First decoding data $DE_1$ comprising first values $v1_0 \sim v1_n$ is generated by decoding $DAT_1$ according to the DCT method and first values $v1_0 \sim v1_n$ are used to update decoding values $DV_0 \sim DV_k$ in the decoding pattern table when the encoded result is the first data $DAT_1$ encoded according to the DCT method. (S11) Second decoding data $DE_2$ is generated by decoding $DAT_2$ according to the decoding pattern table when the encoded result is the second data $DAT_2$ encoded according to the encoding pattern table. (S12)

In S11, decoding values $DV_0 \sim DV_k$ are updated by adding the first values, whose differences from the decoding values in the decoding pattern table are larger than a predetermined threshold, to the decoding pattern table. Number of the decoding values in the decoding pattern table is under a predetermined value, the decoding value which is first added to the decoding pattern table is replaced with the adding first value when the number of the decoding values reaches the predetermined value.

In S12, second data $DAT_2$ comprises a plurality of bins $b_0 \sim b_n$ and second decoding data $DE_2$ comprises a plurality of second values $v_0 \sim v_0$. Each bin is compared with the decoding indexes in the decoding pattern table to generate second decoding data $DE_2$. Second values $v2_0 \sim v2_n$ in $DE_2$ are equivalent to the decoding values corresponding to the decoding indexes which are equivalent to bins $b_0 \sim b_n$ in $DAT_2$.

Based on the pattern table in the embodiment, the images which have repeated pixel values may be encoded by the indexes with a shorter data length than encoded by the DCT method. For the images without repeated pixel values, the values in the pattern table are not similar to the pixel values and the image cannot be correctly encoded by the pattern table, the images encoded by the DCT method in the embodiment. Accordingly, the disclosed image processing device and method may efficiently increase the compression rate especially for the synthetic images which usually have repeated pixel values.

Systems and methods, or certain aspects or portions thereof, may take the form of a program code (i.e., instructions) embodied in a tangible media, such as floppy diskettes, CD-ROMS, hard drives, or any other machine-readable storage medium, wherein, when the program code is loaded into and executed by a machine, such as a computer system and the like, the machine becomes an apparatus for practicing the invention. The disclosed methods and apparatuses may also be embodied in the form of a program code transmitted over some transmission medium, such as electrical wiring or cabling, through fiber optics, or via any other form of transmission, wherein, when the program code is received and loaded into and executed by a machine, such as a computer or an optical storage device, the machine becomes an apparatus for practicing the invention. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image processing device, receiving image data comprising a plurality of pixel values, comprising:
   a first encoder configured to generate first data by encoding the image data according to a predetermined method;
   a second encoder configured to generate second data by encoding the image data according to an encoding pattern table, wherein the encoding pattern table is set up in accordance with the first data; and
   an encoding switch configured to determine to output either the first data or the second data as an encoded result and generate a mark value for indicating the encoded result.

2. The image processing device claimed in claim 1, wherein the encoding pattern table comprises a plurality of encoding indexes and encoding values, each encoding value corresponds to one of the encoding indexes.

3. The image processing device claimed in claim 2, wherein the encoding switch further updates the encoding values in the pattern table by first decoding data, wherein the first decoding data is obtained by decoding the first data.

4. The image processing device claimed in claim 3, wherein the encoded result is determined according to characteristics of the first data and the second data.

5. The image processing device claimed in claim 4, wherein number of the encoding values in the encoding pattern table is under a predetermined value, the encoding value which is first added to the encoding pattern table is replaced with the adding first value when the number of the encoding values reaches the predetermined value.

6. The image processing device as claimed in claim 4, wherein the characteristics are data lengths and coding errors of the first data and the second data, the encoding switch determines to output the second data when the sum of the data length and the coding error of the second data is less than the sum of the data length and the coding error of the first data.

7. The image processing device as claimed in claim 6, wherein the coding error of the first data is calculated according to the pixel values and the first values in the first decoding data, and the coding error of the second data is calculated according to the pixel values and the bins in the second data.

8. The image processing device claimed in claim 3, wherein the first decoding data comprises a plurality of first values, the encoding values are updated by adding the first values, whose differences from the encoding values in the encoding pattern table are larger than a predetermined threshold, to the encoding pattern table.

9. The image processing device claimed in claim 2, wherein the second data comprises a plurality of bins, the second encoder further compares each pixel value with the encoding values in the encoding pattern table to generate the second data comprising the bins in which the bins are equivalent to the encoding indexes corresponding to the encoding values which have the least difference with the pixel values in the encoding pattern table.

10. The image processing device as claimed in claim 1, further comprising:
a second storage element configured to store a decoding pattern table comprising a plurality of decoding indexes and decoding values, with each decoding value corresponding to one of the decoding indexes;
a decoding switch configured to receive the encoded result and the mark value outputted from the encoding switch, determine the encoded result is the first data encoded according to the predetermined method or is the second data encoded according to the encoding pattern table according to the mark value;
a first decoder configured to generate the first decoding data comprising the first values by decoding the first data according to the predetermined method and use the first values to update the decoding values in the decoding pattern table when the encoded result is the first data encoded according to the predetermined method; and
a second decoder configured to generate the second decoding data by decoding the second data according to the decoding pattern table when the encoded result is the second data encoded according to the encoding pattern table.

11. An image processing method performed by a tangible processor, receiving image data comprising a plurality of pixel values by an image processing unit, comprising:
providing an encoding pattern table comprising a plurality of encoding indexes and encoding values stored in a first storage element, each encoding value corresponding to one of the encoding indexes;
generating first data by encoding the image data according to a predetermined method;
generating second data by encoding the image data according to the encoding pattern table;
determining to output either the first data or the second data as an encoded result according to characteristics of the first data and the second data by an encoding switch;
obtaining first decoding data comprising first values by decoding the first data according to the predetermined method and using the first values to update the encoding values in the encoding pattern table when the encoded result is the first data encoded according to the predetermined method; and
generating a mark value indicating the encoded result is the first data encoded according to the predetermined method or is the second data encoded according to the encoding pattern table.

12. The image processing method as claimed in claim 11, wherein the second data comprises a plurality of bins, further comprising comparing each pixel value with the encoding values in the encoding pattern table to generate the second data comprising the bins in which the bins are equivalent to the encoding indexes corresponding to the encoding values which have the least difference with the pixel values in the encoding pattern table.

13. The image processing method as claimed in claim 11, wherein the encoding values are updated by adding the first values, whose differences from the encoding values in the encoding pattern table are larger than a predetermined threshold, to the encoding pattern table.

14. The image processing method as claimed in claim 13, wherein number of the encoding values in the encoding pattern table is under a predetermined value, the encoding value which is first added to the encoding pattern table are replaced with the adding first value when the number of the encoding values reaches the predetermined value.

15. The image processing method as claimed in claim 11, wherein the characteristics are data lengths and coding errors of the first data and the second data, the second data is determined to be outputted when sum of the data length and the coding error of the second data is less than sum of the data length and the coding error of the first data.

16. The image processing method as claimed in claim 15, wherein the coding error of the first data is calculated according to the pixel values and the first values in the first decoding data, the coding error of the second data is calculated according to the pixel values and the bins in the second data.

17. The image processing method as claimed in claim 11, further comprising:
receiving the encoded result and the mark value from the encoding switch by a decoding switch;
providing a decoding pattern table comprising a plurality of decoding indexes and decoding values stored in a second storage element, each decoding value corresponding to one of the decoding indexes;
determining the encoded result is the first data encoded according the predetermined method or is the second data encoded according to the encoding pattern table according to the mark value;
generating the first decoding data comprising the first values by decoding the first data according to the predetermined method and using the first values to update the decoding values in the decoding pattern table when the encoded result is the first data encoded according the predetermined method; and
generating second decoding data by decoding the second data according to the decoding pattern table when the encoded result is the second data encoded according to the encoding pattern table.

18. The image processing method as claimed in claim 17, wherein the second data comprises a plurality of bins and the second decoding data comprises a plurality of second values, further comprising comparing each bin with the decoding indexes in the decoding pattern table to generate the second decoding data comprising the second values in which the second values are equivalent to the decoding values corresponding to the decoding indexes which are equivalent to the bins in the second data.

19. The image processing method as claimed in claim 17, wherein the decoding values are updated by adding the first values, whose differences from the decoding values in the decoding pattern table are larger than a predetermined threshold, to the decoding pattern table.

20. The image processing method as claimed in claim 11, wherein the predetermined method is discrete cosine transformation (DCT).

* * * * *